United States Patent

[11] 3,584,469

| [72] | Inventor | Mervin R. Butts<br>West Milton, Ohio |
|---|---|---|
| [21] | Appl. No. | 879,123 |
| [22] | Filed | Nov. 24, 1969 |
| [45] | Patented | June 15, 1971 |
| [73] | Assignee | General Motors Corporation<br>Detroit, Mich. |

[54] RESILIENT MOUNTING AND SUPPORT FOR ELECTRIC MOTORS AND THE LIKE
5 Claims, 3 Drawing Figs.

[52] U.S. Cl. .................................................. 62/295,
   310/51, 310/91, 248/26, 62/297
[51] Int. Cl. ...................................................... F25d 19/00
[50] Field of Search .......................................... 310/51, 91;
   248/26; 62/295, 297

[56] References Cited
UNITED STATES PATENTS
1,764,761   6/1930   Spreen ........................ 248/26

| 2,345,438 | 3/1944 | Tompkins .................. | 310/91X |
| 2,551,514 | 5/1951 | Truelove .................... | 62/295 |

FOREIGN PATENTS

| 833,259 | 7/1938 | France ........................ | 248/26 |

*Primary Examiner*—William J. Wye
*Attorneys*—S. Carter and P. A. Taucher

ABSTRACT: The invention pertains to a resilient mounting used to mount electric motors in a motor housing on refrigeration units. The motor housing includes a plurality of spaced-apart recesses or openings on the periphery of the inner surface or face, while the electric motor includes a plurality of complementary spaced lugs also having recesses or openings formed therein, the motor and motor housing recesses when in the assembled position being opposite each other. Isolators formed of a rubber or rubberlike material fit into the complementary recesses on the motor housing and recesses in the lugs on the motor to yieldably and resiliently support the motor within the housing.

PATENTED JUN 15 1971

3,584,469

INVENTOR
Mervin R. Butts
BY
P.A. Faucher
ATTORNEY

RESILIENT MOUNTING AND SUPPORT FOR ELECTRIC MOTORS AND THE LIKE

In the use and support of electric motors, it is desirable that operational noises and vibrations of the motor be kept as low as possible. This is desirable in order to keep human annoyance noise levels to a minimum and therefore is especially true and desirable in electric motors intended for domestic appliance use, such as washing machines, fans, dryers, refrigerators, and similar appliances, as well as other applications where electric motors are used.

The invention includes the use of an improved vibration isolating resilient mounting member used for yieldably and resiliently supporting electric motors and the like, whereby the transmission of vibration and other noise producing forces from the motor to a stationary supporting structure and the surrounding environment is greatly reduced.

Figure 1:
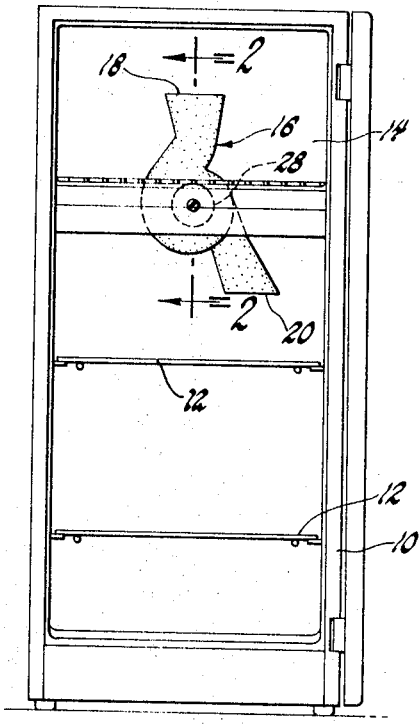
FIG. 1 is a plan view of a refrigeration unit.

FIG. 1 shows a refrigeration unit 10 having shelves 12. Evaporator compartment 14 at the top of the refrigeration unit houses a fan scroll member 16 having a first upper outlet 18 and a second lower outlet 20. The outlets 18, 20 on fan scroll 16 are connected to a duct work system (not shown) that circulates the air into and through the freezer and food storage compartments, the operation of which is generally described in U.S. Pat. No. 3,252,292 to O'Connell et al. as well as the U.S. Pat. No. 3,407,016 to Kronenberger.

Figure 2:
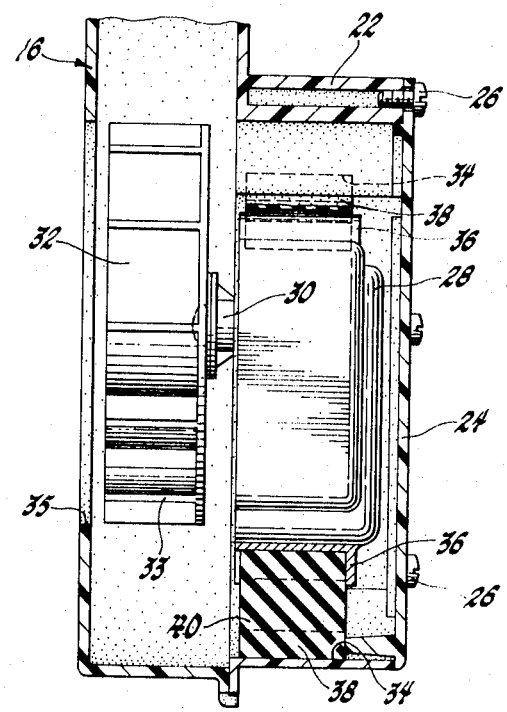
FIG. 2 is a sectional view taken along lines 2–2 in FIG. 1 to show details of the motor mounted in a motor housing in the refrigeration unit.

FIG. 2 shows a motor housing 22 integral with and located within fan scroll 16 and having an end closure plate 24 secured thereto by screws 26. The electric motor 28 mounted within motor housing 22 has an outer drive shaft 30 thereon which is connected to and drives a radial fan impeller wheel blower 32. Blower 32 has blades 33 thereon that draw air through opening 35 from within the refrigeration unit and direct the air within the fan scroll into the duct system.

Figure 3:
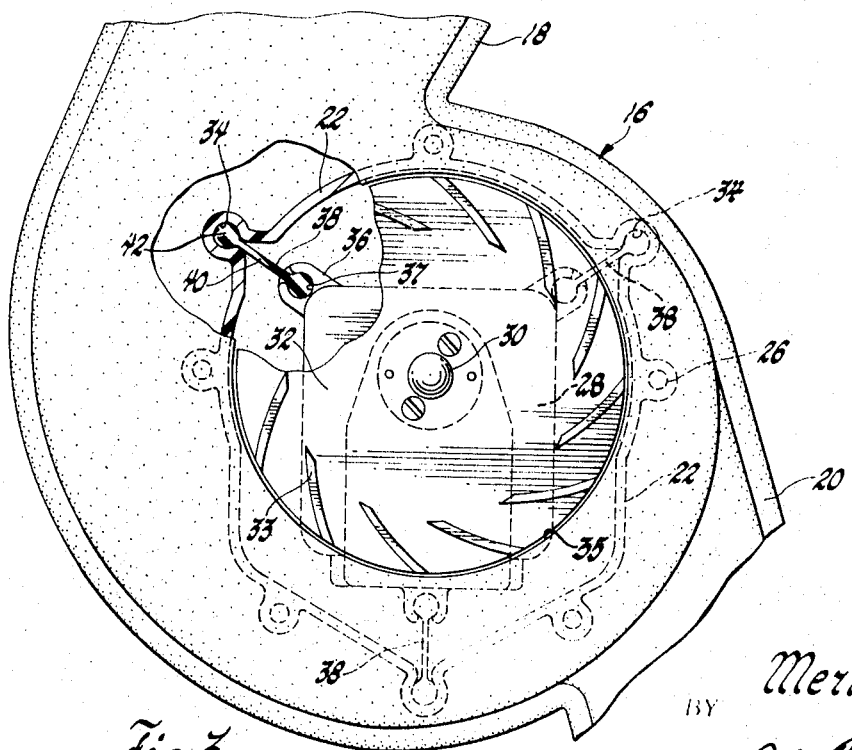
FIG. 3 is a plan view of FIG. 2 partly broken away to specifically show the connection of the mounting member to the recesses in the motor housing and electric motor, with the electric motor mounted in place.

As best shown in FIG. 3, the motor housing has a plurality of recesses or circular openings 34 on the interior surface that extend the full length of the housing. The motor housing has at least three recesses therein, with at least two of the recesses located above the center line of the housing. Electric motor 28 has a plurality of integral lugs 36, also having recesses or circular openings 37 therein, that extend the full length of the motor and are arranged in a complementary manner and located opposite the recesses on the housing when in the assembled position. There are at least three lugs on the motor, with two of the lugs located above the center line of the motor. The recesses in the housing and lugs extend the full length thereof for easy assembly with isolators 38.

Isolators 38 connect motor 28 to the motor housing and are generally formed or molded from rubber or similar material and include a thin web center section 40 and, as shown in FIG. 2, are substantially the same length as the lugs on the motor. Each isolator has a bulbous portion 42 at each end of the thin web center section that mates with and slides into recesses 34 on the motor housing and recesses 37 on lugs 36 on motor 28 to centrally mount the motor in a suspended manner within the housing. The configuration and length of the rubber isolators is such that they will prevent tipping of the blower 32 to prevent contact with the scroll 16 and further will yield during operation of the motor to isolate the housing from motor vibrations.

The isolators which provide an inexpensive, easily manufactured, and highly effective means of preventing vibrations and noise in the refrigeration unit can be assembled to the motor to make up a subassembly prior to the final assembly to the motor housing. The bulbous end portions and thin web portion of the isolators provide a resilient, nonrigid connection of the motor to the motor housing.

While my invention has been described in terms of certain specific embodiments thereof, it should be appreciated that other forms might be adapted by one skilled in the art; and, therefore, the scope of my invention is not to be considered limited by the specific embodiments disclosed.

I claim:

1. In an appliance unit having a motor housing and an electric motor mounted in said motor housing, the improvement comprising: said motor housing having a plurality of spaced apart circular recesses therein on the interior surface facing said electric motor, a plurality of lugs also having recesses therein on said electric motor opposite to and in a complementary relationship to said circular recesses in said housing, and a plurality of resilient isolators having a center web segment with enlarged end portions at each end of said center web segment, wherein said enlarged end portions of each isolator fit into the complementary recesses on said motor housing and lugs on said electric motor to centrally suspend said electric motor within said motor housing to dampen noise of said appliance unit by the elimination of vibrations of said electric motor to said motor housing through resilient action of said isolators.

2. In combination: a refrigeration unit having a freezer and food storage compartment; fan scroll means in communication with an evaporator compartment in said refrigeration unit and including a first outlet to direct air into the freezer compartment of said refrigeration unit, and a second outlet to direct air to the food storage compartment of said refrigeration unit; said fan scroll means having an integral motor housing; an electric motor within said motor housing; said electric motor having a radial vane impeller blower to direct air to the first and second outlets and secured thereto by means of an outboard drive shaft; wherein the improvement comprises: a plurality of spaced recesses on said motor housing; said spaced recesses being of generally circular configuration and extending the length of said housing; a plurality of complementary spaced lugs on said electric motor also having circular recesses therein opposite the recesses on said motor housing wherein said lug recesses extend the length of said electric motor; and a plurality of isolators having a thin center web segment between enlarged bulbous ends that fit into the circular openings on said motor housing and electric motor, and extend substantially the length of said electric motor, whereby said isolators suspend the electric motor centrally within said motor housing and yieldably isolate the motor housing from the electric motor to dampen noise of said refrigeration unit by dampening motor vibrations to the motor housing through the resilient action of said isolators.

3. In the invention as set forth in claim 1, wherein said isolators have enlarged bulbous end portions.

4. In the invention as set forth in claim 1, wherein said motor housing has at least three recesses therein, and wherein said motor has at least three complementary lugs thereon, with two of said recesses in said housing and two of said lugs on said motor being above the centerline of said housing and motor.

5. In the invention as set forth in claim 2, wherein said motor housing has at least three recesses therein, and wherein said motor has at least three complementary lugs thereon, with two of said recesses in said housing and two of said lugs on said motor being above the centerline of said housing and motor.